UNITED STATES PATENT OFFICE.

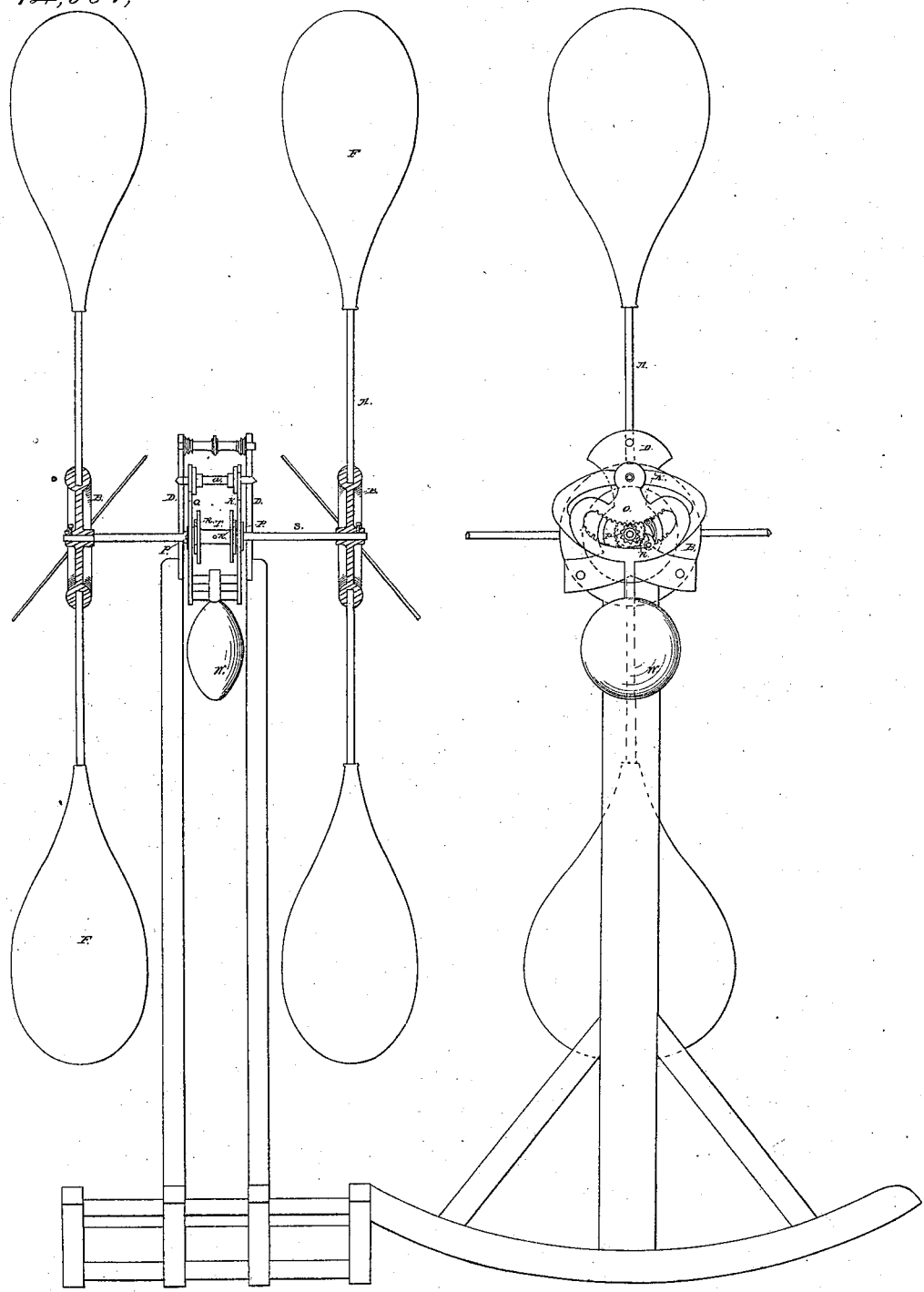

BENJ. M. LEWY, OF MONTGOMERY, ALABAMA.

FAN ROCKING-CHAIR.

Specification of Letters Patent No. 14,507, dated March 25, 1856.

*To all whom it may concern:*

Be it known that I, BENJAMIN M. LEWY, of the city of Montgomery, in the State of Alabama, have invented a new and useful Machine for Ventilating Rocking Chairs, Cradles, or other Rocking Articles of Furniture; and I do hereby declare that the following is a full, clear, and exact description of the construction and operation of the same, reference being had to the annexed drawings, making a part of this specification, in which—

Figure 1, is a full view of the machine, and Fig. 2, is a representation of one half of the machine.

F, F, represent two fans; two plates D, D, are put together with three posts. Arbor S passing through the lower part of the plates D, D, carries on the extreme of each end a swing wheel or fan bearer B, B, for the purpose of making the fans F, F, revolve on the center of arbor S. Between the plates D, D, are two round plates fastened on arbor, S, each sustaining a click, C, working loose on the screws, and a little spring to keep the click, C, falling downward, both clicks C standing to one opposite on the arbor, S, between plate D on each side, a ratchet wheel, R, fastened each on a pinion, P, which are turning loose on arbor S, when turning from the click, C, and by turning to C, will fall in the ratchet wheel, R; then two half wheels, K, O, fastened on the arbor, G, and on the lower end between K, O, is a weight, W, fastened to each end of K, O, by two screws; then W, K, O, G, make one pendule, K has its teeth below the arbor S, and O, its teeth opposite the arbor, S; then by rocking, the pendule W, K, O, G, falling forward will drive the pinion P, and the ratchet wheel, R, against the click, C; so O, puts the arbor in a turning state so much as its length will require to fall, while in the meantime K turns a pinion and ratchet wheel larger than that driven by, O. The two pinions P, P, have to be divided according to the teeth of K, it being larger than O, and obliged to fall more, and by dividing the pinion P, on the side of O, with less teeth according as it is required; the teeth of O, will drive the arbor, S, as much as K will do by having the teeth below the arbor S, so as to get an equal pushing back and forward by giving to pinion P, P, the right number of teeth.

What I claim as my invention and desire to secure by Letters Patent, is—

A pendulum, or self acting driver, so applied to any rocking chair or cradle or other rocking article of furniture as that it will act by its inertia to drive the fans.

BENJAMIN M. LEWY.

Witnesses:
JOHN ENGELHARDT,
HENRY RUDOLPH.